June 30, 1953           F. P. WARRICK           2,643,871
MAGNETICALLY BIASED CENTRIFUGAL SPEED SENSING MEANS
Filed Nov. 30, 1951           2 Sheets-Sheet 1
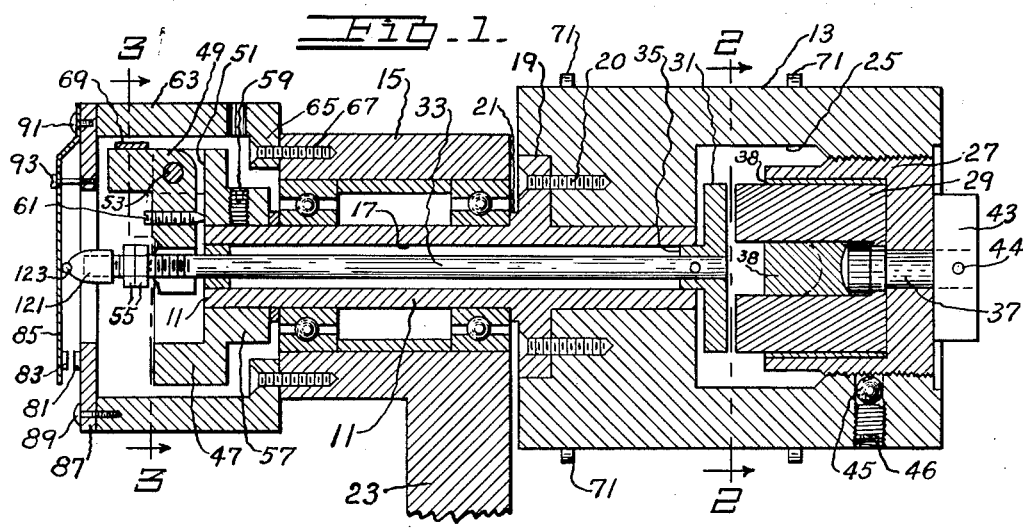
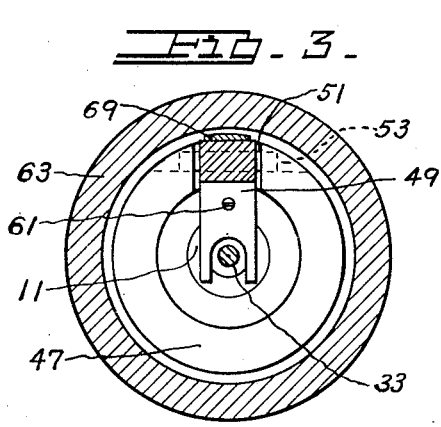
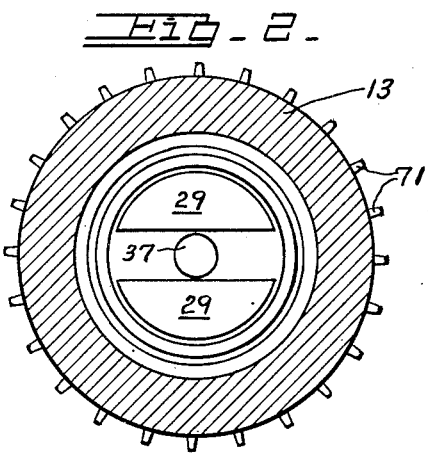
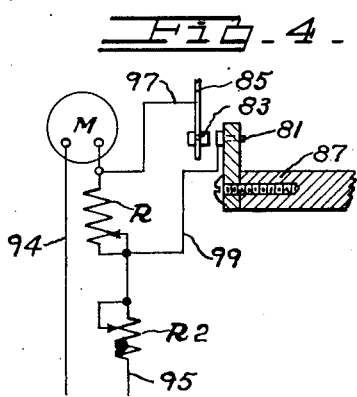
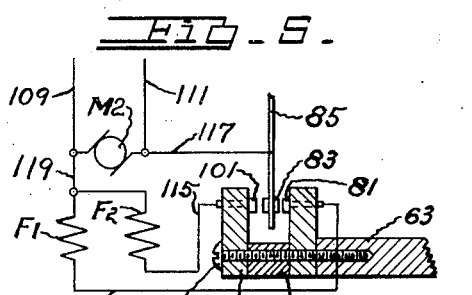
INVENTOR.
FREDERICK P. WARRICK
BY
His Attorney

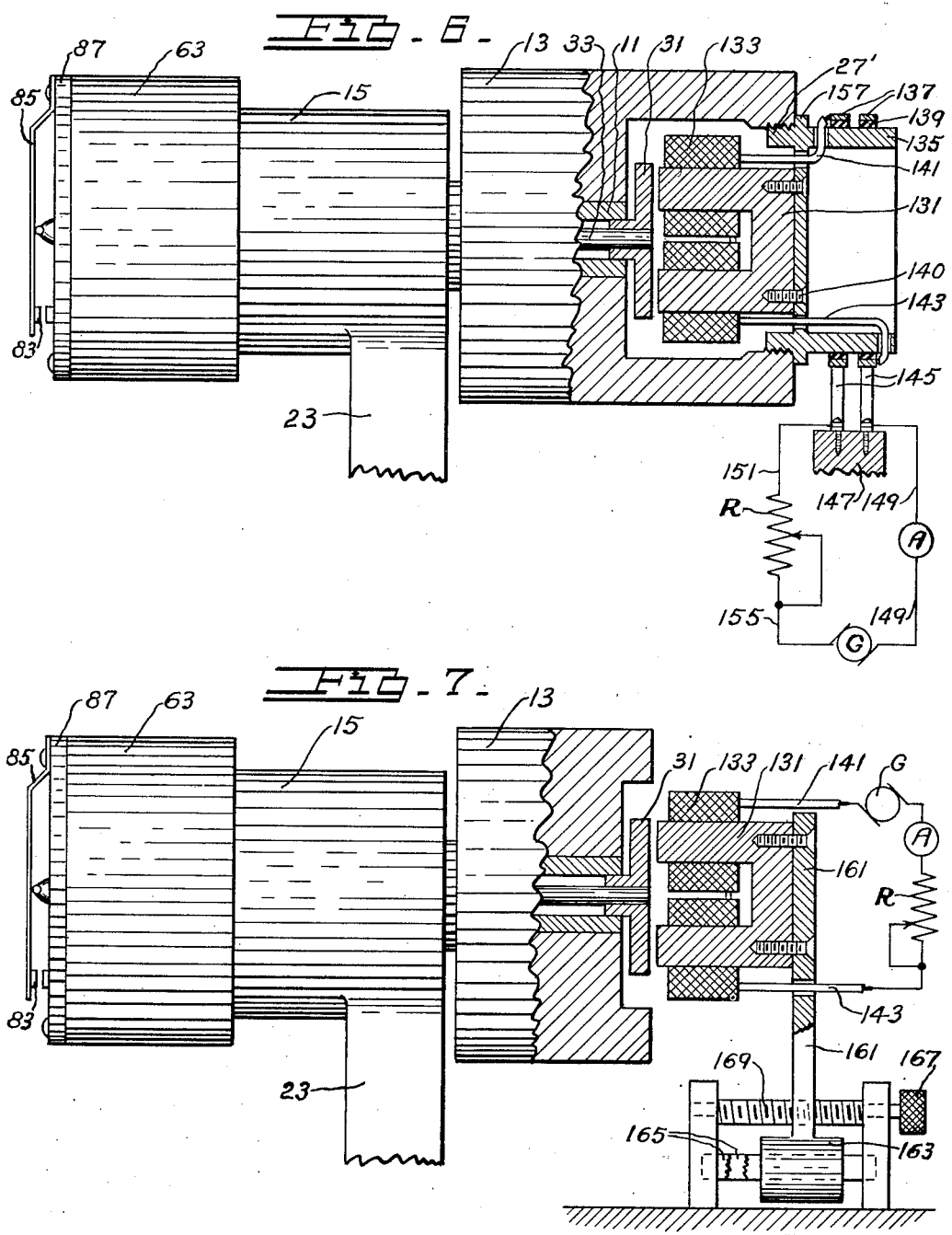

Patented June 30, 1953

2,643,871

UNITED STATES PATENT OFFICE 2,643,871

MAGNETICALLY BIASED CENTRIFUGAL SPEED SENSING MEANS

Frederick F. Warrick, Birmingham, Mich.

Application November 30, 1951, Serial No. 259,057

8 Claims. (Cl. 264—3)

The invention pertains to means sensitive to speed and more particularly to apparatus responsive to speed of rotation for accomplishing some control or regulation.

Previously known speed responsive devices have either been unsuitable for high speed operation, or have not been adjustable over a wide range of speeds, or have been larger, complicated, delicate and unreliable.

It is accordingly an object of my invention to provide speed sensitive means which is operative at high speeds but which may be adjusted for operation over a wide range of speeds.

It is also an object of the invention to provide such speed sensitive means which is of a simple rugged construction embodying but few movable parts and which is reliable in operation.

It is a further object of the invention to provide speed responsive means having biasing means arranged so that an opposing biasing force is applied in such a manner that it is suddenly reduced when the apparatus operates in response to speed increasing to a predetermined value or alternatively the biasing force suddenly increases when the speed decreases below a predetermined speed.

A further object of the invention is to provide speed responsive apparatus in which the speed sensitive arrangement is compact and self-contained.

Another object of the invention is to provide speed sensitive means which is simply and conveniently adaptable for many different applications and uses.

A further object of the invention is to provide speed sensing means which avoids the use of resilient biasing means with the usual disadvantages and limitations of operation inherent therein.

Further objects and advantages are within the scope of the invention such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of the invention, wherein similar reference characters are applied to the corresponding elements throughout, and in which:

Fig. 1 is a longitudinal sectional view showing the sensitive apparatus;

Fig. 2 is a cross-sectional view taken on line 2—2 in Fig. 1;

Fig. 3 is a cross-sectional view taken on line 3—3 in Fig. 1;

Fig. 4 is a fragmentary view showing the control end of the device arranged for a different control;

Fig. 5 is a similar view showing a still different control arrangement which may be operated by the speed sensing apparatus; and Figs. 6 and 7 are side elevational views, partially broken away and sectioned, showing the speed responsive apparatus with different arrangements of the biasing force means.

Referring more specifically to Figs. 1, 2 and 3 of the drawings, it will be seen that my speed sensing apparatus comprises a shaft 11 having a magnet casing 13 on one end and rotatively supported in a bearing 15 with the magnet casing at one side of the bearing and the shaft projecting through and extending from the other side of the bearing. The shaft is tubular being provided with an aperture 17 extending axially therethrough and opening into the magnet casing 13. This casing may be centrally apertured to receive the end of the shaft 11 for rigid attachment and accurate alignment which is further assured by an annular flange 19 projecting from the shaft and turned integral therewith adjacent the bearing.

The closed end of the magnet casing is turned toward the bearing and it is provided with an annular recess to snugly receive the shaft flange 19 whereupon it is rigidly secured by screws 20, or in any suitable manner. The shaft flange 19 is preferably turned down on the side adjacent to the bearing to provide a bearing abutting shoulder ring 21.

The bearing 15 may be provided with friction reducing ball bearings, and by means of a support or bracket 23 extending from the bearing, the device may be mounted upon or adjacent to any apparatus or machine where it is to be utilized. Or this support may be a part of such machine or apparatus.

The magnet casing 13 is internally recessed to form a central cavity 25 opening from the end remote from the bearing and internally threaded to adjustably receive a cup shaped cap 27. This cap internally supports a permanent magnet 29 with the poles of the magnet projecting into the casing toward the bearing, and spaced from the bottom of the cavity in the casing. By turning this cup shaped cap 27 into or out of the magnet casing 13, the poles of the permanent magnet may be spaced at any desired position from an armature 31 for varying the magnetic pull thereon. The armature 31 is supported on the end of a link or connector 33 extending through the axial passage in the tubular shaft, wherein it is slidably disposed. The armature 31 may be in disc form and turned down to provide a hub 35 of a diameter suitable to slide into the end of the shaft 11 and centrally apertured to receive the end of the link 33 secured therein, as by a transverse pin.

The yoke portion of the permanent magnet 29 is centrally apertured to be secured into the cup shaped cap 27 by a retainer pin 37 of non-magnetic material extending through between the poles of the magnet and outwardly through the center of the cap, which is centrally apertured to receive this pin as a snug press fit. The inner end of this retainer pin 37 has a head of slightly larger diameter for securing the magnet yoke. The cap 27 is made of non-magnetic material, such as aluminum, and the magnet spaced from the side-walls thereof is secured more rigidly by pouring in a molten plastic or other material 38 around legs of the magnet.

To facilitate rotating and adjusting the cap in the magnet casing, the cap is preferably provided with an externally projecting finger tab 43, secured on the outer end of the retainer pin by a pin 44. And to hold it in any adjusted position a rubber or synthetic rubber ball 45 is pressed against the side of the cap in a recess in the side of the casing, as by a screw 46 therein.

Projecting through and extending from the other side of the bearing the other end of the hollow shaft is provided with any suitable support means 47 for supporting a centrifugal weight 49 movably so that in response to increasing speed it tends to draw the link and pull the armature away from the magnet. This is readily accomplished by providing the support means or centrifugal bracket 47 in the general form of an annular collar which is provided with a slot 51 wherein the weight 49 is pivoted on a pin 53.

The weight is of a substantially L-shape and positioned with one arm, the outer arm, extending substantially parallel to the axis of rotation of the shaft so that when rotating it tends to be moved outwardly by centrifugal force causing the other or inner arm to pull on the link 33. The inner arm of the L-shaped weight is slotted at the end to loosely receive the end of the link 33 the latter having a pair of lock nuts 55 for an adjustable stop to be engaged by the inner arm of the weight. The centrifugal bracket 47 has a centrally apertured hub 57 which fits over the end of the shaft whereon it is secured, as by a screw 59. The inner arm of the L-shaped centrifugal weight which connects with the link is also provided with an adjustable stop screw 61 which by engagement with the centrifugal support bracket limits the movement of the link and the armature toward the magnet. By turning the stop screw 61, the space distance between the armature disc 31 and the bottom of the magnet casing 13 can be adjusted, and by turning the cup-like cap 27 therein, the distance between the magnet poles and the armature can be adjusted to predetermine the speed response characteristics of the apparatus.

For protectively enclosing these speed sensitive elements I provide a drum 63 having an inwardly extending flange 65 secured to the end of the bearing by screws 67. When the speed responsive device is to be utilized for speed control by applying a retarding force, this operation is readily accomplished by installing a pad 69 of a suitable material, such as felt secured by cement, upon the outer side of the outer arm of the centrifugal weight. In this position the friction pad 69 is thrown outwardly into frictional rubbing engagement with the inside of the enclosing drum 63. This enclosing drum is then utilized as a brake drum and the braking action provides a retarding force tending to regulate the speed of the shaft and consequently the speed of any apparatus or member with which it is connected and from which it is driven.

To drive the speed sensing apparatus any suitable driving connection may be provided between this apparatus and the machine or the apparatus or member of which the speed is to be controlled or regulated. As shown, driving teeth 71 are provided around the outer surface of the magnet casing 13 for driving the speed sensing means from the holes provided along the margins of a photographic cinema film, or when such a strip is to be moved at a very high speed for recording transient phenomena. As will be understood, the magnet casing may as well be provided with a suitable gear or cable sheave or other means for receiving a suitable driving connection for various purposes.

In operation, the magnet casing, the shaft, and the centrifugal weight rotate according to the speed of the member or machine to be controlled. When the speed increases to a predetermined speed in accordance with the position of the magnet and the spacing of its poles from the armature, as determined by the adjusted setting of the cap 27, and of the stop screw 61, the centrifugal force acting upon the outer arm of the centrifugal weight is sufficiently great to throw this part of the weight outwardly and at the same time the other or inner arm pulls the link 33 and draws the armature 31 further away from the poles of the magnet. The biasing force supplied by the magnet 29 being variable substantially according to the square, i. e., an exponential relationship, of the distance in the gap between the armature and the magnet poles is thereby caused to suddenly decrease and collapse as the armature moves further away from the magnet. The friction pad 69, on the outer arm of the weight then firmly engages the inside of the stationary drum 63 and applies a retarding force which resists further increasing speed. If the speed then decreases a predetermined amount, the magnetic biasing force then overbalances the centrifugal force acting upon the outer arm of the weight which decreases rapidly because this latter force varies as the square of the angular velocity, and the armature and the link are then drawn toward the magnet by the magnetic biasing force. At the same time the magnetic biasing force is suddenly increased. This quickly pulls the outer arm of the weight in and suddenly eliminates the braking action. These operations take place positively each time the speed passes through a certain predetermined increasing value, or a predetermined decreasing value, and the indefinite hunting action which takes place with a spring biased device is avoided. Whereas a spring applies a force which becomes greater as the spring is stretched further, or is compressed further, and this reduces the responsiveness or the sensitiveness of the apparatus, in my speed responsive apparatus operating with this magnetic biasing force as utilized therein entirely different and superior operating characteristics are provided.

An electrical control can be accomplished either simultaneously with the automatic brake control previously described, or the brake 69 may be omitted. This is readily accomplished by means of a stationary electrical contact 81, as shown in Fig. 1, which is engaged by a movable electrical contact 83 carried on the end of a flexible strip or leaf spring 85, which is disposed in such a manner as to be pushed outwardly by the outer end of the link 33 in response to high speeds. As the speed decreases, the link 33 moves toward the right-hand side and the resilience of the spring 85 carries its contact 83 again into contact with the stationary contact 81.

To support these electrical contacts in a rugged and compact arrangement, a ring 87, as shown in Fig. 1, is secured upon the annular rim of the enclosing drum 63, as by screws 89 extending thereinto. This ring is made of any suitable plastic composition material having electrical insulation properties, and the stationary contact 81 may be mounted directly thereon. The other end of the flexible strip 85 is secured at a diametrically opposed point on this ring, as by screw 91. An adjusting screw 93 passes threadably through the leaf spring 85 at a position for engaging upon the ring 87, and by adjustment the proper operation of the electrical contacts can be assured as the link moves.

Such electrical controlling contacts can be utilized in many different arrangements, one of which is diagrammatically represented in Fig. 4, by way of example. Assuming that the speed sensing device is driven from a motor M, either directly or from some other apparatus thereby driven, a variable resistor R may be connected into the motor energizing circuit comprising leads 94 and 95 whereby the speed of the motor may be adjusted to be slightly below a desirable average operating speed. By conductors 97 and 99 the electrical control contacts 81 and 83 are connected in shunt with the resistor R so that each time the contacts close together the resistor is shunted or shorted out of the motor circuit and the speed of the motor is increased by a small amount. And each time the contacts separate the resistance R is cut into the motor energizing circuit and the motor M is caused to run slower. To provide a very small or precise speed variation in the operation of the motor M, as the contacts open and close, a second variable resistor R2 may be provided in the motor energizing circuit and outside of the contact connections 97 and 99. In this arrangement the resistance of the shunted resistor R may be made a very small part of the total resistance of the two resistances R and R2 in series and the speed variations of the motor M will be very slight as the electrical contacts open and close.

Fig. 5 is a fragmentary view showing a variation of the electrical contact arrangement and diagrammatically representing one electrical control system which may be operated thereby. As shown a second stationary contact 101 is mounted on the outer side of the movable contact 83 so that it its engaged alternatively as the movable contact disengages the first stationary contact. This second stationary contact is supported on an insulating tab 103 secured, as by an elongated screw 105 passing therethrough and through a spacer 107. Application of this alternative control is shown in connection with a motor M2 having two field windings F1 and F2 which are wound in opposed relation so that the motor runs in reversed directions according to which field winding is energized. As shown, the motor M2 is energized from leads 109 and 111 but the field windings F1 and F2 are energized alternatively through inner contact 81 and conductor 113 or through outer contact 101 and conductor 115, as the movable contact 83 moves inwardly or outwardly in response to the speed variations. This may be utilized to completely reverse the direction of the motor M2 and the driven apparatus every time the speed comes up to a predetermined speed. Either field circuit is completed through the movable contact 83 connected by a conductor 117 to conductor 111, and the other ends of the field windings F1 and F2 are connected through a conductor 119 to the other motor energizing lead 109, as shown. As will be readily understood, this double stationary contact or alternative control arrangement may be utilized for many different control arrangements.

For a wear resistant contact between the flexible spring strip 85 and the outer end of the actuator link 33, the latter is preferably provided with a tip 121 of hard material, such as a ceramic material for example, and this is preferably provided with a glass bead 123 having a polished surface at the point of contact with the flexible spring strip.

The control contacts of my speed sensing devices may be protected from arcing and sticking by shunting with a suitable condensor. Also relays may be inserted to accomplish the desired control, where the rapidity of operation is not too great. Such expedients for protecting sensitive contacts are common in the electrical arts.

As Fig. 6 shows, the source of magnetomotive force for biasing the speed sensing elements may be provided in the form of a magnetizable field structure 131 having a suitable magnetizing winding 133 thereon. Such an electromagnet may be mounted into a cup shaped cap 27' which is externally threaded to screw into the open end of the magnet casing 13, in a manner similar to the mounting of the magnet in the modification previously described, for installing the electromagnet with its poles spaced from the armature 31. This armature is mounted upon the end of a connector or link 33 which extends slidably through the tubular shaft 11 which is rotatively supported in a bearing 15 and extends from the other side of this bearing to control speed sensing elements in an enclosing drum 63 secured to the end of the bearing, in the manner previously described.

The cup shaped cap 27' of Fig. 6 is also provided with an annular flange 135 extended outwardly and axially from the outer end of the cap for supporting a pair of slip ring connectors 137 mounted upon insulation 139, to be insulated from each other and from the supporting device. The field structure of the electromagnet may be secured into the cup 27', in any suitable manner, as by screws passing threadably thereinto. From the ends of the winding 133 conductors 141 and 143 extend individually to respective ones of the slip rings which in operation are engaged by resilient brushes 145 carried upon a stationary brush holder 147. From one brush 145 a conductor 149 extends to one side of any suitable source of electric current G. From the other brush 145 a conductor 151 extends to a variable resistor or rheostat R, from which a conductor 155 connects to the other side of said electric source G.

In operation, the cap 27' is screwed into the open end of the magnet casing 13 to bring its electromagnet poles to a predetermined spaced distance from the armature, as determined by a stop flange 157 on the cap. The resilient brushes 145 are set into proper engagement with the slip rings 137 for energizing the electromagnet and providing the biasing force for the speed sensing elements to operate in the manner previously described. In this embodiment, the adjustment of this biasing force may be conveniently accomplished merely by setting the rheostat R, and this may be done while the device is rotating. To facilitate adjusting or returning to a previous adjustment, an ammeter A may be inserted into the energizing circuit, if desired.

As Fig. 7 shows, the biasing electromagnet may be mounted stationarily and separately from the rotating device upon a bracket 161 whereby the slip ring connections may be eliminated and the energizing conductors 141 and 143 may be extended for direct connection with a suitable electric source G. Also the variable resistor or rheostat R is similarly utilized for controlling the magnitude of the magnetic biasing force provided to the speed sensing device, in the same manner as previously described, and an ammeter instrument A may also be similarly utilized for convenience and accuracy in making such adjustments of the biasing force.

In the Fig. 7 modification, the electromagnet carrying bracket 161 is provided with a suitably enlarged portion 163 having spaced apertures through which a pair of horizontal support rods 165 slidably pass, and the bracket can be moved back and forth merely by turning the knurled knob 167 to turn a threaded shaft 169 which extends threadably through a suitable aperture in the bracket. By the mechanical adjustment of turning the knob 167 the bracket 161 can be moved to set the poles of the electromagnet at various spaced distances from the armature which is connected with the speed sensing elements, and such mechanical adjusting can also be done while the device is rotating. Or the mechanical setting may be done while the device is stationary and the spaced distance can be measured directly, and then the electrical adjusting can be done while the device is operating. In the modification shown in Fig. 7, the field structure 131 may be a permanently magnetized member, the winding 133 being omitted and the adjustment of the biasing force provided can still be accomplished by moving the permanent magnet back and forth to various spaced distances from the armature 31, as above described, to suit the operating characteristics desired.

It will be seen that I have provided speed sensing and control apparatus which is compact and self contained, which eliminates resilient biasing means, which is adaptable to a wide variety of applications, and which is operative over a wide range of speeds, as well as having improved biasing force arrangements for such sensitive apparatus. All of the modifications of my speed sensing and control apparatus may be advantageously utilized for controlling the speed of operation of motion picture projection apparatus with sound track, or for apparatus for making the record on film combined with sound. Also my apparatus may be advantageously utilized for accurate speed control of electric organs and for many other purposes.

It is apparent that within the scope of the invention modifications and different arrangements may be made other than herein disclosed, and the present disclosure is illustrative merely, the invention comprehending variations thereof.

What I claim as my invention is:

1. Speed responsive control apparatus comprising, rotary means adapted to be rotatively supported and rotated in accordance with a speed to be observed or regulated, speed sensitive means, means movably mounting said speed sensitive means on said rotary means for rotation therewith and having a movement relatively thereto in accordance with the speed of rotation, an armature mounted movably on said rotary means by connection means connecting it to said speed sensitive means to be moved in a predetermined direction parallel to the axis of rotation by movements of said speed sensitive means, a source of magneto-motive-force mounted adjacent said armature to attract the armature in a direction opposite to said predetermined direction for resisting such movements of the armature by said speed sensitive means until a predetermined speed has been reached to cause the speed sensitive means to apply sufficient force to move with the armature thereby causing the magnetic force on the latter to suddenly collapse thus releasing the speed sensitive means which completes a predetermined movement in response to such predetermined speed, and control means actuated by said predetermined movement of the speed sensing means.

2. Speed responsive control apparatus comprising, rotary means operative in accordance with a speed to be observed or regulated, speed sensitive means, mounting means movably mounting said speed sensitive means on said rotary means for rotation therewith and for separate movement in accordance with the speed of rotation of said rotary means, an armature connected to speed sensitive means, a source of magnetomotive force disposed for applying a biasing force on said armature tending to oppose the movement of said speed sensitive means in response to increasing speed until a predetermined speed is reached after which the opposing biasing force is suddenly decreased thereby releasing the speed sensitive means which moves in response to the speed, adjustable means connected to said source of magnetomotive force so that the biasing force applied to the armature can be conveniently varied to predetermine the speed responsive characteristics of the apparatus as desired, and control means positioned cooperatively to said speed sensitive means for actuation by speed responsive movements thereof.

3. Speed responsive control apparatus in accordance with claim 2 and further characterized by said adjustable means being a movable mounting for said source of magnetomotive force so that the position thereof can be varied to move it closer to or further away from said armature.

4. Speed responsive control apparatus in accordance with claim 2 and said adjustable means being variable energizing means for variably energizing said source of magneto-motive force to vary the magnetomotive force of said source.

5. Speed responsive control apparatus comprising, a bearing, a tubular shaft rotatively supported in said bearing and protruding on both sides therefrom for rotation in accordance with a speed to be observed or regulated, a link slidably disposed in said tubular shaft, an armature carried on one end of said link, a source of magnetomotive force mounted adjacent said armature for applying a biasing force tending to draw the armature and the link, a centrifugal weight mounted movably on the other end of said tubular shaft so as to tend to move by centrifugal force as said shaft rotates and connected to tend to pull said link axially in said tubular shaft to draw said armature away from said source in accordance with the speed of rotation of said shaft, and control means mounted adjacent to and in actuable relation with said link to accomplish a control when the centrifugal weight moves said link axially in said shaft.

6. Speed responsive control apparatus in accordance with claim 5 and further characterized by said centrifugal weight being L-shaped with an inner arm recessed and loosely receiving the end of said link remote from said armature, means securing said end of said link from withdrawing from said arm, and a pivot supporting the mid-portion of said weight pivotally upon said shaft so that an outer arm of the weight tends to be thrown outwardly by centrifugal force causing the inner arm of the L-shaped weight to pull the link axially in the tubular shaft and to thereby draw the armature away from the source of magnetomotive force.

7. In speed sensitive control apparatus the combination of, a tubular axially apertured shaft having a magnet casing at one end, said shaft being rotatable in accordance with a speed to be observed or regulated, a bearing rotatively supporting said shaft with the magnet casing disposed at one side of the bearing and the other end of the shaft protruding from the other side of the bearing, a link slidably disposed in said shaft and extending therefrom at both ends, an armature carried and secured on one end of said link in said magnet casing, a magnet, adjustable support means supporting said magnet in said magnet casing with its poles toward said armature and spaced at predeterminable adjusted distances therefrom, a centrifugal bracket secured on the other end of the shaft to rotate therewith, a centrifugal weight mounted movably on said centrifugal bracket for movement by centrifugal force as said shaft rotates, means connecting said weight to pull said link axially in said shaft to draw said armature away from said magnet as said weight is moved by centrifugal force in accordance with the speed of rotation of said shaft, an adjustable stop limiting movement of the link and arm in the opposite direction by said magnet drawing said armature, and control means mounted cooperatively adjacent said other end of said shaft for actuation by axial movements of said link to accomplish a control when the centrifugal weight moves said link axially in said shaft.

8. Speed sensitive control apparatus in accordance with claim 7 and further characterized by said centrifugal weight being L-shaped with an inner arm recessed and loosely receiving therethrough the end of said link remote from said armature, means securing said end of said link from withdrawing from said arm, and a pivot securing the mid-portion of said weight in said centrifugal bracket so that the outer arm of the weight tends to be thrown outwardly by centrifugal force thereby causing the inner arm of said weight to pull the link axially in the shaft and draw the armature away from the magnet.

FREDERICK P. WARRICK.

References Cited in the file of this patent

UNITED STATES PATENTS

| Number | Name | Date |
|---|---|---|
| 474,447 | Gibboney | May 10, 1892 |
| 744,198 | Howe et al. | Nov. 17, 1903 |
| 847,597 | Onsum et al. | Mar. 19, 1907 |
| 1,067,454 | Atwood | July 15, 1913 |
| 1,651,800 | Bennett et al. | Dec. 6, 1927 |
| 1,750,361 | Rothermel et al. | Mar. 11, 1930 |
| 2,099,849 | Holmes | Nov. 23, 1937 |
| 2,105,529 | Gerlach | Jan. 18, 1938 |
| 2,301,348 | Wallgren et al. | Nov. 10, 1942 |
| 2,367,209 | Gore | Jan. 16, 1945 |
| 2,368,567 | Philo | Jan. 30, 1945 |